July 1, 1952  R. KEBLUSEK  2,601,719

DRY-SHAVING APPARATUS

Filed July 1, 1946

INVENTOR.
RICHARD KEBLUSEK
BY *Wenderoth Lind & Ponack*

ATTORNEYS

Patented July 1, 1952

2,601,719

UNITED STATES PATENT OFFICE 2,601,719

DRY-SHAVING APPARATUS

Richard Keblusek, Eindhoven, Netherlands, assignor to Hartford National Bank and Trust Company, Hartford, Conn., as trustee Application July 1, 1946, Serial No. 680,572
In the Netherlands November 4, 1942

Section 1, Public Law 690, August 8, 1946
Patent expires November 4, 1962

4 Claims. (Cl. 30—43)

It has been previously suggested in connection with dry-shaving apparatus to use a cutting plate having a varying thickness for the purpose of securing a mechanically stable construction of this fragile member at the area of the apertured running surface of the cutter.

According to the invention, such a cutting plate is also used for another purpose by providing dry-shaving apparatus which comprises a cutting plate of the aforesaid type with a cutter which is only associated with part of the running surface thereof.

Since in the use of apertures of identical size the capacity of the cutting plate to place the skin and hairs in a cutting position, which capacity is hereinafter referred to as the transmitting power, decreases with increasing thickness and vice versa, use may be made of a cutter which in accordance with the requirements to be satisfied cooperates either with a thicker or thinner part of the cutting plate. In this case, however, it is not essential that a cutting plate having apertures of identical size should always be used. It is even possible to accentuate the variable transmitting power of an essentially secured cutting plate by the use of a cutting plate of varying thickness by forming larger apertures in the thinner parts and smaller apertures in the thicker parts of the cutting plate with the result that the variations in thickness of the cutting plate can be maintained within narrower limits. If larger variations in thickness are desirable for some reason, for example, with a view to securing mechanical stability, the effect may be reduced by the use of apertures of differing size.

Particular shaping of the cutter may in addition allow the cutter to be in operating condition in various positions, the running surface of the cutting plate covered by the cutting edges being different in each position.

In order that the invention may be clearly understood and readily carried into effect, it will now be described more fully with reference to the accompanying drawing, in which.

Figure 1:
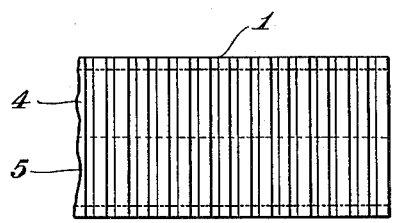
Figure 1 shows a plan view of a cutting plate according to the invention.
Figure 1A:
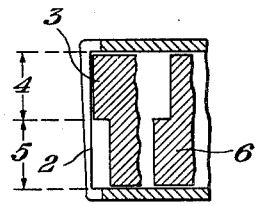
Figure 1a shows a cross-sectional view of the cutting plate of Figure 1.

Referring to Figure 1, a cutting plate 1 has a variable thickness at the area of the running surface 2. A cutter of the reciprocating type is designated 3, as shown in Figure 1a. According to the invention, the cutting edges of the cutter only cover a part of the running surface, viz. the part 4 whose transmitting power for the skin and the hairs, owing to the larger thickness at the area here, is less than that of the part 5. By rotating the cutter for half a revolution it is caused to occupy the position designated 6 in which the part 5 of the running surface is covered.

Figure 2:
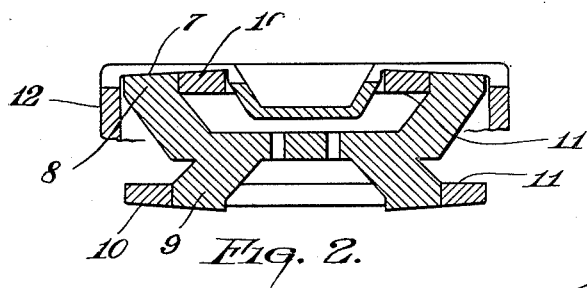
Figure 2 shows a sectional view of a modification of the cutting plate of Figure 1.
Figure 2A:
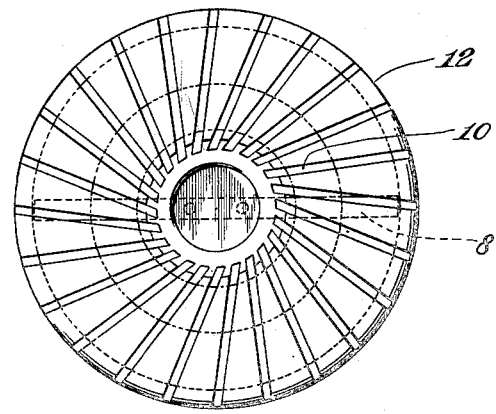
Figure 2a shows a top plan view of the cutting plate of Figure 2.

Referring to Figure 2, the invention is applied to a cutting plate 12 of varying thickness having a rotary cutter. Again, the running surface 7 is only covered in part by the cutter arms 8. By reversing the cutter the part of the cutting plate having a greater transmitting power is caused to become operative since the cutter arms 9 are placed into position for cutting.

It is advisable that the apertures which are not in operation should be covered since the hairs getting into these apertures are not severed and may be clamped therein resulting in a tensile stress being exerted on the skin. These apertures may be closed for example, by means of a small covering plate but preferably by the use of a smooth continuous running surface fixed to the cutter, as shown at 10 in Figure 2. Such running surfaces are obtained by the provision of annular bodies 11.

Similarly, the cutter 3 in Figure 1 may also be extended by means of a covering running surface.

Figure 3:
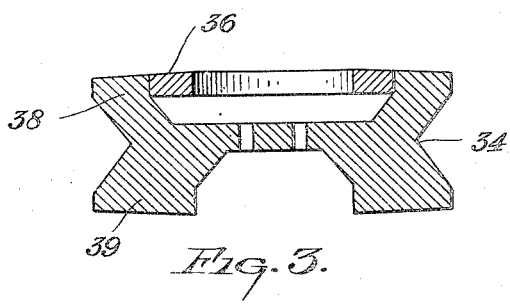
Figure 3 shows a sectional view of still another modification of the cutting plate of Figure 1.

For that part of the public which is capable of shaving with the part of the cutting plate having the greater transmitting power use is preferably made of a cutter 34 which has one of its arms 39 covering the entire running surface of a cutting plate so that a maximum effect is ensured. Such a cutter is shown in Figure 3. The other cutter arm 38 only covers part of the running surface (not shown) while a ring 36 closes part of the apertures (also not shown).

What I claim is:

1. A cutter head for dry shaving apparatus comprising a cutting plate of varying thickness and constituting a first running surface portion and a second running surface portion contiguous to said first running surface portion and having a thickness greater than the thickness of said first running surface portion, and a reversible cutter member comprising a first cutting portion adapted to cut along said first running surface portion and a second cutting portion disposed opposite said first cutting portion and adapted to cut along said second running surface portion, said first cutting portion engaging said first running surface in one position of said cutter and said second cutting portion engaging said second running surface in the reversed position of said cutter.

2. A cutter head for dry shaving apparatus comprising a cutting plate of varying thickness and constituting a first running surface portion and a second running surface portion contiguous to said first running surface portion and having a thickness greater than the thickness of said first running surface portion, and a reversible cutter member comprising a first cutting portion and an adjacently positioned first bearing surface portion and a second cutting portion disposed opposite said first cutting portion and an adjacently positioned second bearing surface portion, said cutter member having either the first cutting portion and said first bearing surface portion engaging said first running surface portion in one position of said cutter or the second cutting portion and second bearing surface portion engaging said second running surface portion in the reversed position of said cutter.

3. A cutter head for dry shaving apparatus comprising a substantially flat substantially rectangular cutting plate of varying thickness and constituting a first longitudinally arranged running surface portion and a second longitudinally arranged running surface portion contiguous to said first running surface portion and having a thickness greater than the thickness of said first running surface portion, and a reversible substantially rectangular cutter member comprising a first cutting portion in the plane of said first running surface portion and a second cutting portion, disposed opposite said first cutting portion and in the plane of said second running surface portion, said first cutting portion engaging said first running surface portion in one position of said cutter and said second cutting portion engaging said second running surface in the reversed position of said cutter.

4. A cutter head for dry shaving apparatus comprising an annular cutting plate of varying thickness and constituting a first annular running surface portion and a concentric second annular running surface portion contiguous to said first running surface portion and having a thickess greater than the thickness of said first running surface portion, and a reversible rotatable cutter member comprising a first cutting portion at the same radial distance as said first annular running surface portion and a second cutting portion at the same radial distance as said second annular running surface portion but disposed opposite to said first cutting portion on said cutter, said first cutting portion engaging said first annular running surface portion in one position of said cutter and said second cutting portion engaging said second annular running surface portion in the reversed position of said cutter.

RICHARD KEBLUSEK.

REFERENCES CITED

The following references are of record in the file of this patent:

UNITED STATES PATENTS

| Number | Name | Date |
| --- | --- | --- |
| 1,633,063 | Bernarducci | June 21, 1927 |
| 2,036,557 | Viall | Apr. 7, 1936 |
| 2,105,223 | Nicholl | Jan. 11, 1938 |
| 2,212,624 | Testi | Aug. 27, 1940 |
| 2,269,875 | Huntington | Jan. 13, 1942 |
| 2,338,700 | Wilhoit | Jan. 11, 1944 |